(12) United States Patent
Welch, Jr. et al.

(10) Patent No.: US 8,640,884 B2
(45) Date of Patent: *Feb. 4, 2014

(54) FLUID TREATMENT ELEMENTS AND FLUID TREATMENT ARRANGEMENTS WITH SPACES BETWEEN FLUID TREATMENT ELEMENTS AND METHODS FOR MAKING AND USING THEM

(75) Inventors: Thomas Welch, Jr., Homer, NY (US); Tanweer ul Haq, Tully, NY (US); Joseph Verschneider, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 664 days.

This patent is subject to a terminal disclaimer.

(21) Appl. No.: 12/531,702

(22) PCT Filed: Mar. 14, 2008

(86) PCT No.: PCT/US2008/057030
§ 371 (c)(1),
(2), (4) Date: Apr. 14, 2010

(87) PCT Pub. No.: WO2008/115802
PCT Pub. Date: Sep. 25, 2008

(65) Prior Publication Data
US 2010/0206810 A1 Aug. 19, 2010

Related U.S. Application Data

(60) Provisional application No. 60/907,068, filed on Mar. 19, 2007.

(51) Int. Cl.
*B01D 39/00* (2006.01)
*B01D 27/00* (2006.01)
*B01D 35/00* (2006.01)
*B01D 35/28* (2006.01)
*B01D 59/50* (2006.01)
*B01D 46/10* (2006.01)
*B01D 46/24* (2006.01)

(52) U.S. Cl.
USPC .......... 210/487; 210/437; 210/323.1; 55/482; 55/483; 55/520

(58) Field of Classification Search
USPC ......... 210/330, 331, 346, 347, 486, 487, 488, 210/437, 438, 494.1, 494.3, 767; 29/896.62; 55/482, 483, 520
See application file for complete search history.

(56) References Cited

U.S. PATENT DOCUMENTS 1,792,797 A 2/1931 Armstrong
1,820,533 A 8/1931 Foley
(Continued)

FOREIGN PATENT DOCUMENTS

DE 144 207 A1 10/1980
EP 0 291 883 A2 11/1988
(Continued)

*Primary Examiner* — Ling Choi
*Assistant Examiner* — Catherine S Branch
(74) *Attorney, Agent, or Firm* — Leydig, Voit & Mayer, Ltd.

(57) ABSTRACT

Fluid treatment arrangements and methods for making and using fluid treatment arrangements are disclosed. A ribbon including a permeable fluid treatment medium may be spirally wound in a plurality of windings to form a fluid treatment element having a disk-shaped body. For some embodiments, the ribbon may comprise a composite having first and second layers. At least two and as many as fifty or more fluid treatment elements may be positioned along a core assembly with spaces between at least some of the adjacent fluid treatment elements. Many, most, or substantially all of the spaces may be substantially free of structure. A fluid treatment arrangement may be contained in a housing to form a fluid treatment assembly. The housing may include an inlet port and an outlet port and may define a fluid flow path between the inlet port and the outlet port. The fluid treatment arrangement may be positioned in the housing across the fluid flow path.

18 Claims, 7 Drawing Sheets

(56) References Cited

U.S. PATENT DOCUMENTS

| | | | |
|---|---|---|---|
| 1,824,079 A | 9/1931 | Foley | |
| RE19,359 E * | 11/1934 | Armstrong | 210/494.1 |
| 2,339,703 A | 1/1944 | Kamrath | |
| 2,537,897 A | 1/1951 | Hunter | |
| 2,561,685 A | 7/1951 | Boggs | |
| 2,631,732 A | 3/1953 | Vocelka | |
| 2,646,887 A | 7/1953 | Robinson et al. | |
| 2,816,665 A | 12/1957 | Layte et al. | |
| 3,061,107 A | 10/1962 | Taylor | |
| 3,165,471 A | 1/1965 | Hencken | |
| 3,347,391 A | 10/1967 | Steensen | |
| 3,592,769 A | 7/1971 | Decker | |
| 4,410,427 A * | 10/1983 | Wydeven | 210/317 |
| 4,695,300 A | 9/1987 | Takagi | |
| 4,792,397 A | 12/1988 | Rasmussen | |
| 6,113,784 A | 9/2000 | Stoyell et al. | |
| 6,669,844 B2 | 12/2003 | Strohm et al. | |
| 6,827,851 B1 | 12/2004 | Strohm et al. | |
| 7,351,345 B2 | 4/2008 | Diemer et al. | |
| 7,357,866 B2 | 4/2008 | Diemer et al. | |
| 2002/0046971 A1 | 4/2002 | Strohm et al. | |
| 2004/0035783 A1 | 2/2004 | Strohm et al. | |
| 2004/0079694 A1 | 4/2004 | Diemer et al. | |
| 2004/0094467 A1 * | 5/2004 | Diemer et al. | 210/347 |
| 2005/0155923 A1 | 7/2005 | Diemer et al. | |
| 2008/0169234 A1 | 7/2008 | Diemer et al. | |
| 2008/0230470 A1 | 9/2008 | Diemer et al. | |

FOREIGN PATENT DOCUMENTS

| | | | |
|---|---|---|---|
| EP | 0 666 094 A2 | 8/1995 | |
| FR | 873 926 A | 7/1942 | |
| GB | 9228 | 0/1911 | |
| GB | 1440814 * | 6/1976 | B01D 27/04 |
| JP | 60-238112 A | 11/1985 | |
| JP | 62-123215 U | 8/1987 | |
| WO | WO 01/21279 A1 | 3/2001 | |
| WO | WO 03/041829 A2 | 5/2003 | |
| WO | WO 2007/017110 A1 | 2/2007 | |
| WO | WO 2007/017111 A1 | 2/2007 | |

* cited by examiner

FLUID TREATMENT ELEMENTS AND FLUID TREATMENT ARRANGEMENTS WITH SPACES BETWEEN FLUID TREATMENT ELEMENTS AND METHODS FOR MAKING AND USING THEM

This application claims priority based on U.S. Provisional Application No. 60/907,068, which was filed on Mar. 19, 2007, and is incorporated by reference.

DISCLOSURE OF THE INVENTION

The present invention relates to fluid treatment arrangements and elements and methods for making and using them. In particular, the present invention relates to fluid treatment arrangements and methods for making and using fluid treatment arrangements which include one or more spirally wound fluid treatment elements. A fluid treatment element may be fashioned by spirally winding a ribbon in a plurality of windings to form a generally disk-shaped body. The ribbon may include a long, narrow strip of a permeable fluid treatment medium having first and second opposite major surfaces and first and second opposite side edges. The disk-shaped body may have an end surface which faces in one direction, another end surface which faces in the opposite direction, and an outer rim. To form a fluid treatment arrangement, several of these fluid treatment elements may be positioned along a hollow core assembly with a space between at least some of the elements.

A fluid may be directed through a fluid treatment element, i.e., from one end surface to the opposite end surface of the fluid treatment element. The fluid may enter one end surface of the fluid treatment element from one space adjacent to the end surface and/or the fluid may exit the other end surface of the fluid treatment element to another space adjacent to the other end surface. As the fluid passes through the fluid treatment element, the fluid may generally pass edgewise through the permeable fluid treatment medium of each winding, i.e., the fluid may flow generally laterally within the permeable medium generally parallel to the first and second opposite major surfaces. For example, the fluid may enter the permeable medium through one side edge of the ribbon, flow laterally within the permeable medium to the opposite edge of the ribbon, and exit the permeable medium through the opposite side edge. As the fluid passes through the fluid treatment element, the fluid may also flow from the permeable fluid treatment medium of one winding radially into and then laterally along the permeable medium of one or more adjacent or nearby windings.

Fluid treatment arrangements embodying one or more aspects of the invention may be used to treat fluids, including gases, liquids, or mixtures of gases, liquids, and/or solids, in a wide variety of ways. For many embodiments, the fluid treatment arrangement may be used in a separation process to separate one or more substances from the fluid. For example, the separation process may be a filtration process where a fluid is directed through the fluid treatment elements of the fluid treatment arrangement and substances in the fluid, e.g., particulates or molecules above a certain size, are prevented by the fluid treatment media from passing through the elements with the fluid. As another example, the separation process may be a capture process where a fluid is directed through the fluid treatment elements and substances in the fluid, e.g., ions, molecules, proteins, nucleic acids, or other chemical substances, are chemically or physically bound to the fluid treatment media. For other embodiments, the fluid treatment arrangement may be used in a coalescing process where a fluid is directed through the fluid treatment elements and small droplets of liquid entrained in the fluid are aggregated and enlarged as the fluid passes through the fluid treatment media, allowing larger liquid droplets to emerge from the element and to be more easily removed from the fluid.

SUMMARY OF THE INVENTION

In accordance with one aspect of the invention, fluid treatment arrangements may comprise a hollow core assembly and at least first and second adjacent fluid treatment elements mounted along the core assembly. The core assembly has an interior and an axis. The first fluid treatment element is axially separated from the second fluid treatment element, defining a space between them. Each fluid treatment element includes a ribbon which has a permeable fluid treatment medium, and the ribbon is spirally wound in a plurality of windings to define a generally disk-shaped body which has a radial dimension. The disk-shaped body also has a first end surface on one side of the body, a second end surface on the other side of the body, and an outer rim. An end surface of each fluid treatment element opens directly onto the space. The space extends between the first end surfaces of the first and second fluid treatment elements along at least about 85% of the radial dimension of the first and second fluid treatment elements, and the space is substantially free of structure. A fluid pathway extends between the first and second end surfaces of each fluid treatment element generally edgewise through the permeable fluid treatment medium to or from the space.

In accordance with another aspect of the invention, fluid treatment arrangements may comprise a hollow core assembly and at least first, second, and third fluid treatment elements. The core assembly has an interior and an axis. The first, second, and third fluid treatment elements are mounted along the core assembly. The first fluid treatment element is adjacent to and axially separated from the second fluid treatment element, defining a first space between them. The second fluid treatment element is adjacent to and axially separated from the third fluid treatment element, defining a second space between them. Each fluid treatment element includes a ribbon which has a permeable fluid treatment medium. The ribbon is spirally wound in a plurality of windings to define a generally disk-shaped body. The disk-shaped body has a first end surface on one side of the body, a second end surface on the other side of the body, and an outer rim. The first space extends between the first end surfaces of the first and second fluid treatment elements along at least about 85% of the distance from the core assembly to the outer rims of the first and second fluid treatment elements. The second space extends between the second end surfaces of the second and third fluid treatment elements along at least about 85% of the distance from the core assembly to the outer rims of the second and third fluid treatment elements. The first and second spaces are substantially free of structure. A fluid pathway extends between the first and second spaces generally edgewise through the permeable fluid treatment medium of at least the second fluid treatment element.

In accordance with another aspect of the invention, fluid treatment arrangements may comprise a hollow core assembly, a plurality of disk-shaped fluid treatment elements, and a surround. The hollow core assembly has an interior and an axis. Each fluid treatment element includes a ribbon having at least one strip of a permeable fluid treatment medium, and the ribbon has first and second opposite side edges. The ribbon is spirally wound in a plurality of windings and defines a first axially-facing end surface comprising the plurality of windings of the first side edge of the ribbon, a second axially-facing end surface comprising the plurality of windings of the second side edge of the ribbon, and an outer rim. The fluid treatment elements are positioned along the core assembly with the adjacent fluid treatment elements axially separated from one another and defining a plurality of first spaces and a plurality of second spaces. Each first space extends between the first end surfaces of adjacent fluid treatment elements along at least about 85% of the distance from the core assembly to the outer rims of the adjacent fluid treatment elements. Each first end surface opens directly onto a first space. Each second space extends between the second end surfaces of adjacent fluid treatment elements along at least about 85% of the distance from the core assembly to the outer rims of the adjacent fluid treatment elements. Each second end surface opens directly onto a second space. Each of the first and second spaces is substantially free of structure. The surround is positioned around each first space at the outer rims of the adjacent fluid treatment elements to fluidly isolate an outer end of the first spaces.

In accordance with another aspect of the invention, methods for making a fluid treatment arrangement comprise positioning first and second spirally wound fluid treatment elements along a hollow core assembly axially separated from one another to define a space which extends between the first and second fluid treatment elements along at least about 85% of the radial dimensions of the first and second fluid treatment elements and which is substantially free of structure. The methods also comprise sealing the space substantially free of structure between the outer rims of the first and second fluid treatment elements.

In accordance with another aspect of the invention, methods for treating a fluid may comprise directing the fluid between the exterior of a fluid treatment arrangement and the interior of a core assembly. Directing the fluid between the fluid treatment arrangement and the core assembly includes passing the fluid generally edgewise through the windings of a spirally wound strip of a permeable fluid treatment medium. As the fluid passes through the fluid treatment medium, the fluid may be treated in any of a variety of ways. Directing the fluid between the fluid treatment arrangement and the core assembly also includes passing the fluid through a space which is substantially free of structure and which is adjacent to the spirally wound strip.

Embodiments of the invention provide many advantages. For example, by providing spaces between fluid treatment elements which are substantially free of structure, the fluid treatment arrangements may cost less and perform better. Because many of the spaces may be substantially free of structure, there are no material costs or manufacturing costs associated with putting structures, including spacers such as plates or disks, in these spaces, providing a more economical fluid treatment arrangement. Further, because many of the spaces are substantially free of structure, e.g., free of plates and disks, there is much less resistance to fluid flow through these spaces and the fluid treatment arrangement, which significantly improves the performance of the fluid treatment arrangement. Because the end surfaces of the fluid treatment elements of many embodiments open directly onto the spaces, the resistance to fluid flow can be even further reduced. In addition, because many of the spaces are substantially free of structure, there is less waste to dispose of when the fluid treatment arrangements are spent, which lessens the environmental impact of disposal.

In accordance with another aspect of the invention, fluid treatment elements may comprise a ribbon spirally wound in a plurality of windings to define a disk-shaped body having a radial dimension, a first end surface on one side of the body, a second end surface on the opposite side of the body, an inner rim, and an outer rim. The ribbon may include a multilayer composite having at least first and second superposed layers, and at least one of the layers includes a strip of a permeable fluid treatment medium.

In accordance with another aspect of the invention, methods for making a fluid treatment element may comprise spirally winding a multilayer composite including a permeable fluid treatment medium in a plurality of windings and forming a generally disk-shaped body having opposite end surfaces, an inner rim, and an outer rim.

Further, a fluid treatment element formed from a multilayer composite which includes at least a second layer in addition to a strip of a permeable fluid treatment medium may have any of a wide variety of enhanced features. For example, where the second layer comprises a strengthening strip, the ribbon may be even more tightly wound around the core assembly, further enhancing the structural integrity of the fluid treatment element. Where the second layer comprises a bonding strip, the windings of the ribbon may be even more securely fitted to one another, further enhancing the reliability of the fluid treatment element. Where the second layer comprises another strip of a permeable fluid treatment medium, the ability of the medium to treat the fluid may be varied and/or augmented, further enhancing the effectiveness of the fluid treatment element.

DESCRIPTION OF EMBODIMENTS

Figure 1:
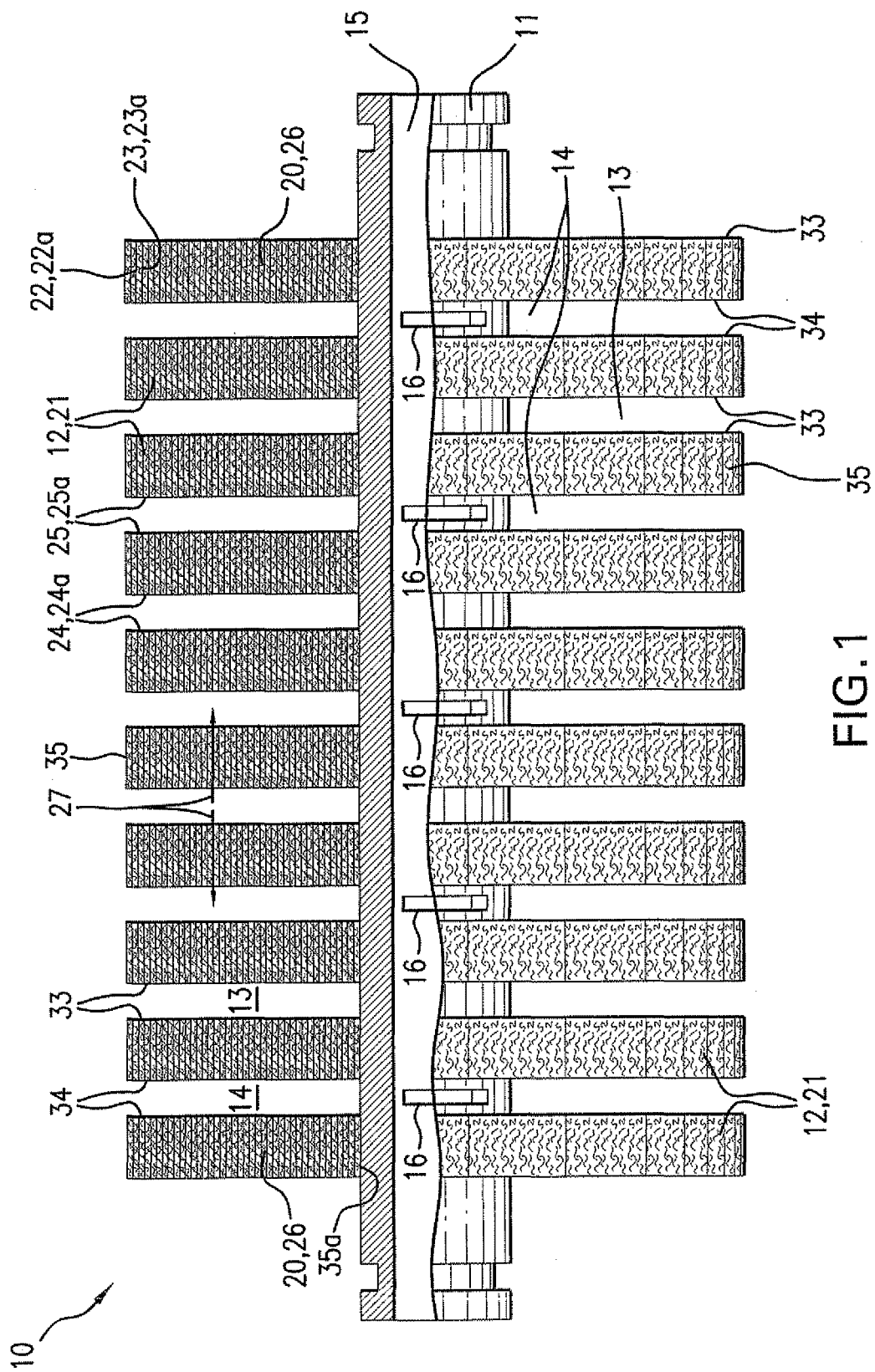
FIG. 1 is a quarter sectioned view of a fluid treatment arrangement.
Figure 2:
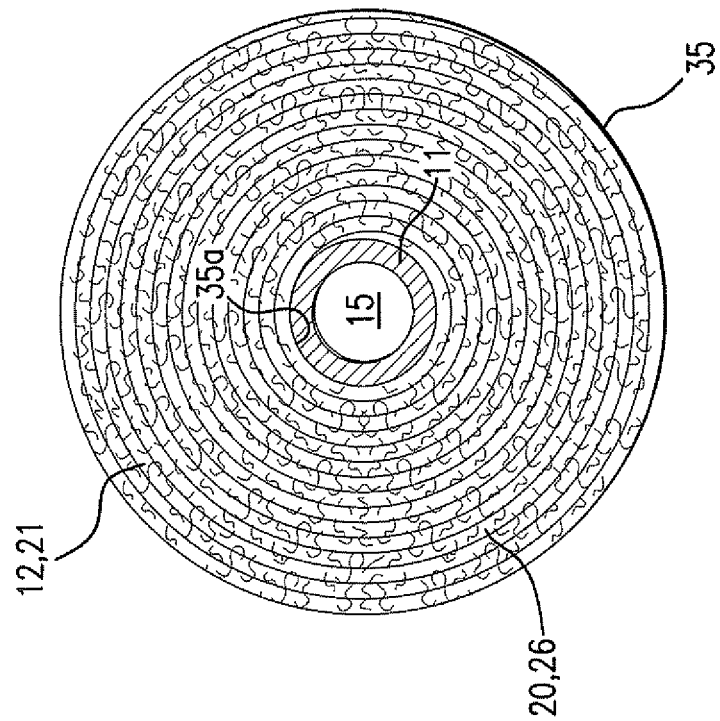
FIG. 2 is a front view of a fluid treatment element of FIG. 1.

Fluid treatment arrangements embodying one or more aspects of the invention may be configured in a wide variety of ways. One example of a fluid treatment arrangement is shown in FIGS. 1 and 2, but fluid treatment arrangements are not limited to the features illustrated in either of these figures. As shown in FIGS. 1 and 2, a fluid treatment arrangement 10 may comprise a core assembly 11 and a plurality of spirally wound fluid treatment elements 12 mounted along the core assembly 11, e.g., circumjacent to and contacting the core assembly 11. The widths and/or radial dimensions of the fluid treatment elements 12 may be similar, e.g., substantially equal, or they may vary along the core assembly 11. All of the fluid treatment elements 12 may be axially separated from one another to define spaces 13, 14 between adjacent fluid treatment elements 12. Alternatively, some of the fluid treatment elements may be axially positioned along the core assembly side-by-side in close proximity, e.g., contacting one another, while others of the fluid treatment elements may be axially separated from adjacent fluid treatment elements to define spaces between them. The core assembly 11 may comprise a core, such as a pipe or a tube, having an axis and a generally hollow configuration, including an interior 15. The core assembly 11 may have two open ends or an open end and a closed or blind end. The core assembly 11 may also have openings 16, e.g., axially separated openings, such as slots or other perforations, which allow some of the spaces 14 to fluidly communicate with the interior 15 of the core assembly 11. The spaces 14 that fluidly communicate with the interior 15 of the core assembly 11 may be fluidly isolated from the exterior of the fluid treatment elements 12, e.g., the region radially beyond the fluid treatment elements. Other spaces 13 may be fluidly isolated from the interior 15 of the core assembly 11, for example, by a solid wall portion of the core assembly 11 which has no openings and which extends across and blocks the inner end of the space, and these spaces 13 may fluidly communicate with the exterior of the fluid treatment elements 12. Still other spaces may be isolated from both the interior of the core assembly and the exterior of the fluid treatment elements. Many of the spaces 13, 14 may be substantially free of structure.

Fluid may be directed generally inwardly or outwardly between the exterior of the fluid treatment arrangement 10, e.g., the region radially beyond the fluid treatment arrangement, and the interior 15 of the core assembly 11. For example, for many embodiments, including the embodiment illustrated in FIG. 1, a feed fluid may be directed along a fluid flow path from the exterior of the fluid treatment arrangement 10 generally radially inwardly into feed spaces 13 which fluidly communicate with the exterior of the fluid treatment elements 12 but are isolated from the interior 15 of the core assembly 11. From the feed spaces 13, the fluid may flow generally axially along the fluid flow path through one or more adjacent fluid treatment elements 12. As fluid flows through the fluid treatment elements 12, the fluid may be treated according to the fluid treatment characteristics of the elements. The fluid may flow generally axially from the fluid treatment elements 12 into permeate spaces 14 which are fluidly isolated from the exterior of the fluid treatment elements 12 but which fluidly communicate with the interior 15 of the core assembly 11 via the openings 16 in the core assembly 11. From the permeate spaces 14, the fluid may flow along the fluid flow path generally radially inwardly through the openings 16 into and then axially along the interior 15 of the core assembly 11. Alternatively, the feed fluid may be directed into the interior of the core assembly and generally radially outwardly along a fluid flow path from the interior of the core assembly through the openings in the core assembly into feed spaces which are fluidly isolated from the exterior of the fluid treatment arrangement. From the feed spaces, the fluid may flow generally axially along the fluid flow path through one or more adjacent fluid treatment elements and into permeate spaces which are fluidly isolated from the interior of fluid treatment arrangement but which fluidly communicate with the exterior of the fluid treatment arrangement. From the permeate spaces, the fluid may flow generally radially outwardly along the flow path to the exterior of the fluid treatment arrangement.

Figure 3:
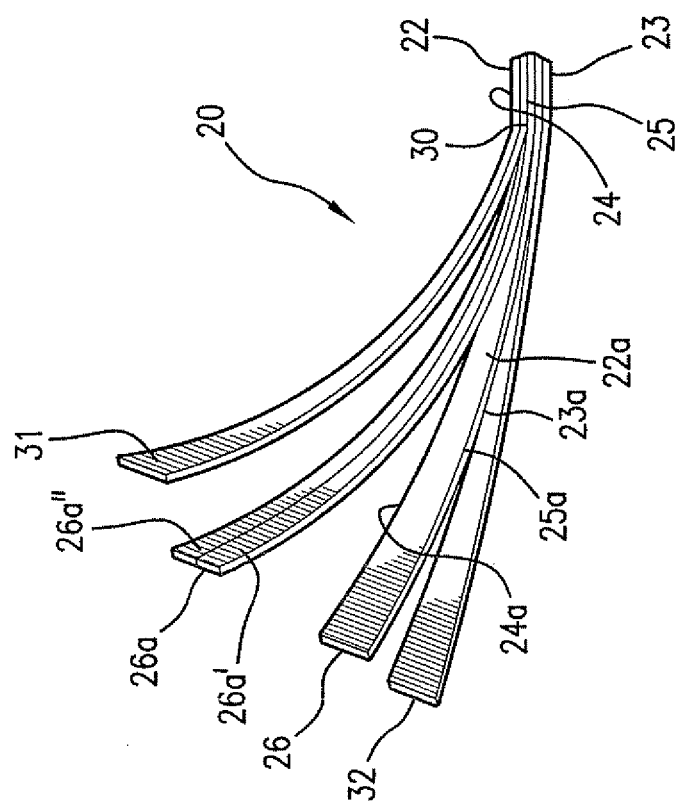
FIG. 3 is an oblique view of a ribbon.

An example of a fluid treatment element 12 is shown in FIG. 2, but fluid treatment elements are not limited to the features illustrated in this figure. As shown in FIG. 2, the fluid treatment element 12 may comprise a ribbon 20 which is spirally wound in a plurality of windings to form a generally disk-shaped body 21. Ribbons may be configured in a wide variety of ways. One example of a ribbon is shown in FIG. 3, but ribbons are not limited to the features illustrated in this figure. As shown in FIG. 3, the ribbon 20 may have a long, narrow configuration with opposite major surfaces 22, 23 and opposite side edges 24, 25. The ribbon 20 includes a strip of a permeable fluid treatment medium 26 which also has opposite major surfaces 22$a$, 23$a$ and opposite side edges 24$a$, 25$a$. The ribbon 20 including the porous fluid treatment medium may be permeable but unperforated, i.e., free of any through holes or through slots which extend between the opposite major surfaces 22, 23; 22$a$, 23$a$.

The permeable fluid treatment medium may be formed from any of numerous materials, including, for example, a natural or synthetic polymer, glass, metal, carbon, and/or a ceramic. The permeable fluid treatment medium may be formed from any of a variety of structures, including, for example, fibrous structures, such as woven or non-woven fibrous strips; meshes, such as woven, extruded, or expanded mesh strips; permeable membranes, such as supported or unsupported membrane strips; porous foam strips; or porous metals, such as porous sintered fiber metal or powder metal strips. The permeable fluid treatment medium may have any of a myriad of treatment characteristics. For example, the permeable fluid treatment medium may have, or may be modified to have, any of several characteristics. The permeable fluid treatment medium may have a positive, negative, or neutral electrical charge; it may be liquiphobic or liquiphilic including, for example, hydrophobic or hydrophilic, or oleophobic or oleophilic; it may include attached functional groups, such as ligands or any other reactive moiety, that can chemically bind to substances in the fluid. The permeable fluid treatment medium may be formed from, impregnated with, or otherwise contain a variety of materials that function to treat the fluid in any of various ways. These functional materials may include, for example, sorbents, ion exchange resins, chromatography media, enzymes, reactants, or catalysts of all types, that may chemically or physically bind, react with, catalyze, deliver, or otherwise affect substances in the fluid or the fluid itself. Further, the permeable fluid treatment medium may have any of a wide range of removal ratings, including, for example, from ultraporous or nanoporous or finer to microporous or coarser. For example, the removal rating may be in the submicron range or finer, e.g., up to about 0.02 μm or coarser or up to about 0.1 μm or coarser, or in the micron range or coarser, e.g., up to about 1 μm or coarser, or about 5 μm or coarser, or about 10 μm or coarser, or about 50 μm or coarser, or about 75 μm or coarser, or about 100 μm or coarser, or about 200 μm or coarser, or about 300 μm or coarser, or about 500 μm or coarser, or about 1000 μm or coarser. For many embodiments, the permeable fluid treatment medium may comprise a filter medium of non-woven glass or polymeric fibers, and the fluid treatment characteristic of the permeable fluid treatment medium may comprise a removal rating of about 0.02 μm or coarser.

The ribbon, including the strip of permeable fluid treatment medium may have a variety of lengths, thicknesses, and widths. For many embodiments, the ribbon may be continuous and extend the full length required to provide a sufficient number of windings to form a fluid treatment element having any desired radial dimension. For other embodiments, shorter segments of the ribbon may be connected end-to-end to extend the full length. Further, for many embodiments, the ribbon may be generally straight along the length of the strip. However, the ribbon may be curved. For example, the ribbon may have a cyclical, e.g., sinusoidal or sawtooth, pattern which extends along the length of the strip.

The thickness of the ribbon, including the strip of permeable fluid treatment medium, i.e., the distance through the ribbon from one major surface to the opposite major surface, may vary from one ribbon to another, depending, for example, on the structure of the porous fluid treatment medium. The thickness may be in the range from about two thousandths of an inch or less, for example, for a thin permeable polymeric membrane, to about 250 thousandths of an inch or more, for example, for a lofty fibrous material or a porous foam. Although the thickness may be nonuniform along the length of a ribbon, for many embodiments the thickness is uniform along the length of the ribbon.

The width of the ribbon, including the strip of permeable fluid treatment medium, i.e., the distance through the ribbon from one side edge to the opposite side edge, may also vary from one ribbon to another. As fluid flows through the fluid treatment element 12, some, most or all of the fluid may pass edgewise through the ribbon and the strip of permeable fluid treatment medium 26 from one side edge 24, 25 to the opposite side edge 25, 24. Consequently, the width of the ribbon may affect the pressure drop and the degree of treatment that the fluid undergoes. For example, the width of the ribbon may affect the filtration efficiency. For many embodiments, the width may be in the range from about one-sixteenth of an inch or less to about 1 inch or 2 inches or 3 inches or more. For example, the width may be in the range from about 2 inches or less, e.g., 1 inch or less, to about one-sixteenth inch or more, including the range from about one-eighth inch or more to about one-half inch or less. Further, the width may be uniform along the length of the ribbon, providing a more uniform treatment of the fluid as it flows through the fluid treatment element. Alternatively, the width of the ribbon may be nonuniform along the length of the strip. For example, the width of the ribbon may vary along the length over a shorter distance, e.g., providing a ribbon with one or two pinked edges, or over a longer distance, e.g., providing a fluid treatment element which tapers to a narrow rim or flares to a wide rim, for example. Ribbons having pinked edges, as well as fringed or frizzed edges, are disclosed, for example, in U.S. Provisional Application No. 60/907,065 entitled Fluid Treatment Elements and Fluid Treatment Arrangements with Fluid Treatment Elements Having Uneven Surfaces and Methods for Making and Using Them, which lists Thomas Welch, Jr., Stephen Geibel, and Tanweer ul Haq as an inventor and which was filed on Mar. 19, 2007, and the PCT International Application which claims priority based on this Provisional Application, both of which are incorporated by reference to support these and other features.

The ribbon 20 may include the strip of permeable fluid treatment medium 26 as the sole component of the ribbon, and the major surfaces of the fluid treatment medium may be in contact along adjacent windings. Alternatively, the ribbon may include multiple components. For example, the ribbon may include the permeable fluid treatment medium as one layer of a multilayer composite 30 with two or more layers superposed on one another, as shown in FIG. 3. Various additional layers may be included, such as additional layers of permeable fluid treatment media 26a. The fluid treatment media 26, 26a may be identical to, or different from, one another. For example, the permeable fluid treatment medium layers may have the same fluid treatment characteristics or different fluid treatment characteristics, providing a fluid treatment element with fluid treatment media having different fluid treatment characteristics in parallel with one another. Another additional layer may be a strengthening strip 31 that enhances the structural integrity of the ribbon. The ribbon may be in tension as it is wound in multiple windings to form the fluid treatment element, and the strip of permeable fluid treatment medium may not have sufficient strength to withstand the tension. Consequently, a strengthening strip 31 that can withstand the tension, such as a strip of a polymeric film, may be layered with the fluid treatment medium. Another additional layer may be a bonding strip 32 for bonding adjacent surfaces of adjacent windings of the ribbon.

While the multiple layers of the composite ribbon may not all have of the same width or be in register, for many embodiments, the multiple layers all have substantially the same width and the side edges are in register, as shown in FIG. 3. The ends of the layers may be in register or may be staggered. For many embodiments, the thickness of the additional layers, other than any additional fluid treatment medium layers, may be less than the thickness of the fluid treatment medium layers to increase the relative volume of the fluid treatment medium within the fluid treatment element. To reduce the amount of fluid that may bypass the fluid treatment medium as it flows through the fluid treatment element, the resistance to fluid flow edgewise through the additional layers may be at least substantially equal to or greater than the resistance to fluid flow edgewise through the fluid treatment medium layers. For some embodiments, the permeability edgewise through the additional layers may be at most substantially equal to or less than the permeability and edgewise through the fluid treatment medium layers, and/or the removal rating edgewise through the additional layers may be substantially equal to or finer than the removal rating edgewise through the fluid treatment medium layers. For many embodiments, some or all of the layers of the composite ribbon, other than the permeable fluid treatment medium layers, may be impermeable. Alternatively, the resistance to fluid flow edgewise through the additional layers may be less than the resistance to fluid flow edgewise through the fluid treatment medium layers. For some embodiments, the permeability edgewise through the additional layers may be greater than the permeability edgewise through the fluid treatment medium layers, and/or the removal rating edgewise through the additional layers may be coarser than the removal rating edgewise through the fluid treatment medium layers.

Alternatively or additionally, the ribbon may include multiple components, e.g., two, three, four, five, or more components, that are arranged side-by-side in series in the fluid flow path edgewise through the ribbon. The side-by-side components may have spaces or intervening structures between them or may be arranged in close proximity, e.g., in contact. For example, multiple strips of fluid treatment media may be arranged edge side-by-edge side. The additional layer 26a of porous fluid treatment medium shown in FIG. 3 is but one example of a side-by-side arrangement of multiple strips. One strip 26a' may be positioned in close proximity to an adjacent strip 26a". For example, the side edges of the strips 26a', 26a" may contact one another along the length of the ribbon 20. The media may be similar to or different from another. For some embodiments, two or more of the media may have different pore sizes, e.g., each successive medium may have a larger or smaller removal rating or pore structure, providing a pore size gradient across the width of the ribbon. For example, the downstream strip of fluid treatment medium may have a finer removal rating or pore structure than the upstream strip of fluid treatment medium. For other embodiments, two or more of the media may provide a different kind of fluid treatment, e.g., filtration, sorption, and ion exchange. The strips in the side-by-side arrangement may have similar or different widths, thicknesses, and/or lengths. The side-by-side strips may be supported in a variety of ways. For example, the multiple strips may be superposed with a support layer. The support layer may be thin and impermeable and may have a width which is less than, about equal to, or greater than the combined widths of the fluid treatment media strips.

Figure 4:
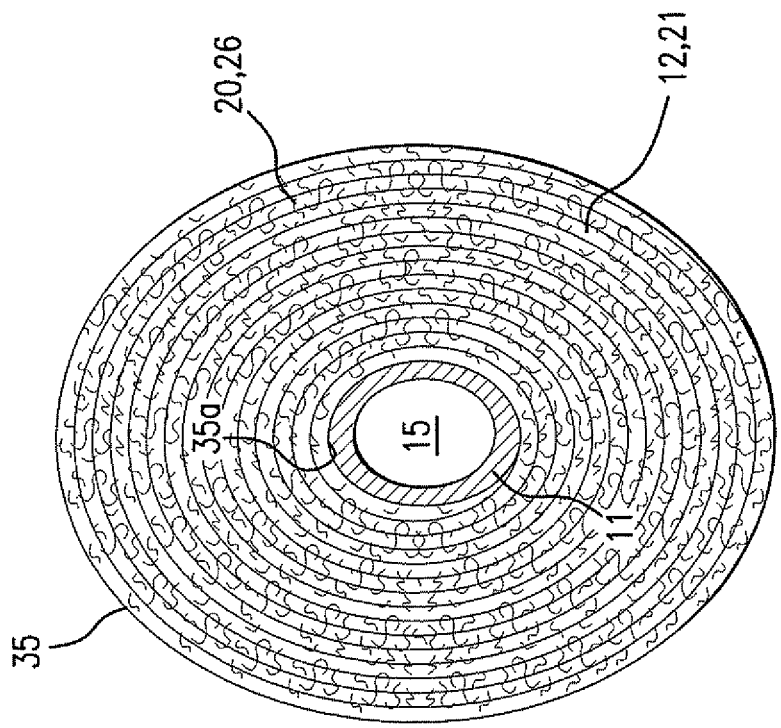
FIG. 4 is a front view of another fluid treatment element.
Figure 6:
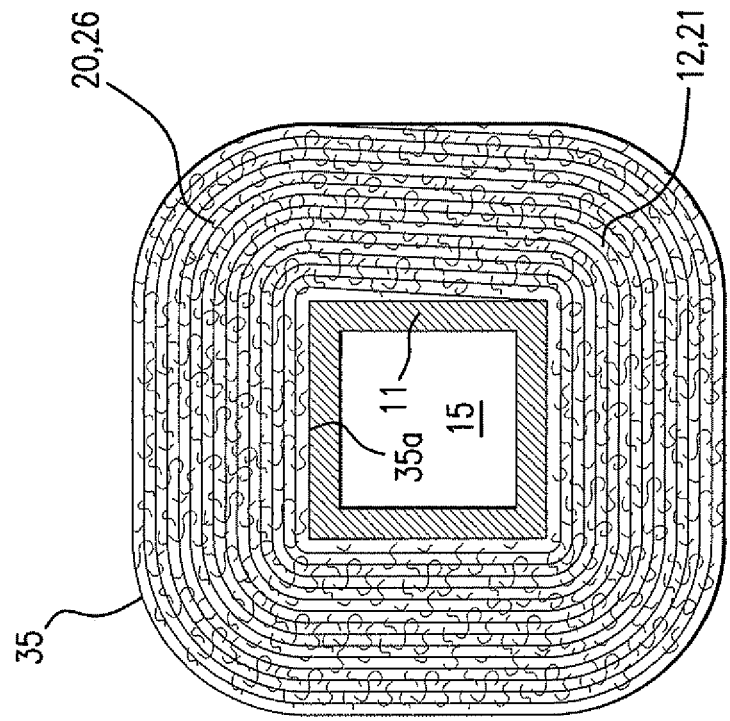
FIG. 6 is a front view of another fluid treatment element.
Figure 5:
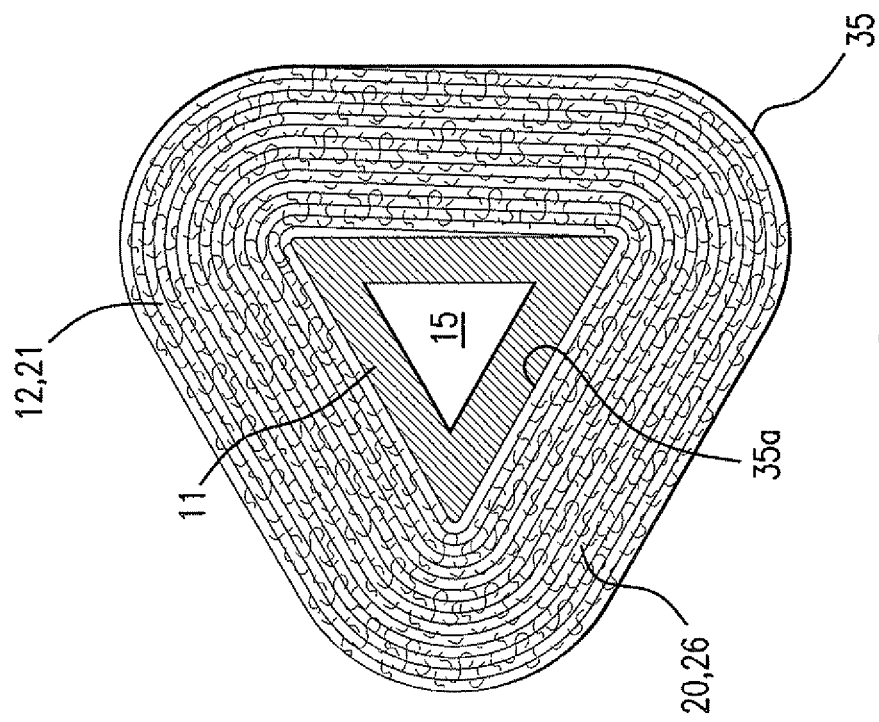
FIG. 5 is a front view of another fluid treatment element.

A fluid treatment element 12 formed by spirally winding the ribbon 20 in a plurality of windings may have any of numerous irregular or regular geometrical forms. For example, the spirally wound disk-shaped body 21, as well as the core assembly 11, of the fluid treatment element 12 may have a generally circular form, as shown in FIG. 2, or a generally oval, triangular, or rectangular form, as shown in FIGS. 4, 5, and 6, respectively. The radial dimension of a fluid treatment element 12, i.e., the dimension generally perpendicular to the axis of the core assembly 11 from the innermost winding to the outermost winding, may vary, depending, for example, on the number of windings and the thickness of the ribbon. For example, the radial dimension may be in the range from up to about ¼ inch or up to about ⅛ inch or less to up to about 1 inch or up to about 2 inches or up to about 6 inches or up to about 10 inches or up to about 25 inches or more. The volume of a fluid treatment element 12 may vary, for example, in accordance with the width of a ribbon and the radial dimension of the disk-shaped body. For some embodiments, all of the fluid treatment elements of a fluid treatment arrangement may have the same volume. For some embodiments, the fluid treatment elements may have different volumes.

As shown in FIG. 1, each disk-shaped body 21 may have an end surface comprising a feed or inflow surface 33 which faces in one axial direction, an end surface comprising a permeate or outflow surface 34 which faces in the opposite axial direction, an outer rim 35 along the exterior of the fluid treatment element 12, an inner rim 35a, and a radial dimension, e.g., from the initial winding near the core assembly to the outer rim 35. Each feed surface 33 may comprise the plurality of windings of one side edge, e.g., the feed side edge 24, of the ribbon 20, including the feed side edge 24a of the permeable fluid treatment medium strip 26. Each permeate surface 34 may comprise the plurality of windings of the other outer side edge, e.g., the permeate side edge 25, of the ribbon 20, including the permeate side edge 25a of the permeable fluid treatment medium strip 26. A fluid pathway 27 may extend generally edgewise between the side edges 24a, 25a through the porous fluid treatment strip 26 from one end surface to the other end surface of the fluid treatment element 12. Either or both end surfaces may be an even surface or may be an uneven surface, for example, as disclosed in previously referenced U.S. Provisional Application No. 60/907,065 entitled Fluid Treatment Elements and Fluid Treatment Arrangements with Fluid Treatment Elements Having Uneven Surfaces and Methods for Making and Using Them and the PCT International Application which claims priority based on this Provisional Application.

The fluid treatment elements may be positioned along the core assembly in close proximity to, e.g., in contact with, one another along an interface or axially separated from one another. For some embodiments, many, most, or substantially all of the fluid treatment elements 12 may be positioned along the core assembly 11 axially separated from one another. Adjacent fluid treatment elements 12 may be structurally separate from one another within the spaces between them. Further, adjacent end surfaces of adjacent fluid treatment elements 12 may be spaced from one another with no points of contact between them. In addition, one or both end surfaces of each fluid treatment element 12 may immediately face and open directly onto a space, and each space may be bounded by the end surfaces of adjacent fluid treatment elements. For many embodiments, the feed surfaces 33 of adjacent fluid treatment elements 12 may face one another and define a feed space 13 between them, and the permeate surfaces 34 of adjacent elements 12 may face one another and define a permeate space 14 between them. In the embodiment shown in FIG. 1, the permeate spaces 14 may fluidly communicate with the interior 15 of the core assembly 11 via openings 16 in the core assembly 11, and the feed spaces 13 may be fluidly isolated from the interior of the core assembly 11 by a solid wall portion of the core assembly. The distance between adjacent fluid treatment elements 12 may define the width of each space 13, 14, and the widths of the spaces 13, 14 may be uniform or non-uniform. For example, the distances between adjacent feed surfaces 33 and the widths of the feed spaces 13, as well as the distances between adjacent permeate surfaces 34 and the widths of the permeate spaces 14, may be substantially equal to, or different from, one another. Further, the distances between adjacent feed surfaces 33 and the widths of the feed spaces 13 may be substantially equal to, or different from, the distances between adjacent permeate surfaces 34 and the widths of the permeate spaces 14.

The spaces 13, 14 may extend between adjacent fluid treatment elements 12 along at least about 85%, or at least about 90%, or at least about 95%, or about 100% of the radial dimension of the fluid treatment elements 12. For example, the spaces 13, 14 may extend at least about 85%, or at least about 90%, or at least about 95%, or about 100% of the distance from the core assembly to the outer rims 35 at the exterior of the elements 12. Further, many of the spaces 13, 14, e.g., up to about 40% or more, may be substantially free of structure. For example, many or all of the feed spaces 13, including at least about 40% or at least about 60%, or at least about 75%, or at least about 90%, or at least about 95%, or about 100% of the feed spaces 13, may be substantially free of structure. Alternatively or additionally, many or all of the permeate spaces 14, including at least about 40%, or at least about 60%, or at least about 75%, or at least about 90%, or at least about 95%, or about 100% of the permeate spaces 14, may be substantially free of structure. Higher percentages are preferred for many reasons. For example, fluid treatment arrangements having at least about 40% of feed spaces and/or permeate spaces which are substantially free of structure have lower material and/or lower manufacturing costs, and the costs associated with higher percentages are even lower still. Further, fluid treatment arrangements having at least about 40% of feed spaces and/or permeate spaces which are substantially free of structure have many operational advantages, including higher flow rates for a given pressure drop or lower pressure drops for a given flow rate, and the advantages associated with higher percentages are greater still.

A space which is substantially free of structure may nonetheless have some structure within the space. For example, a small amount of structure may extend into the space near the core assembly or near the outer rims of the adjacent fluid treatment elements or therebetween. For example, small diameter posts may extend within the space or bands spanning the space between the outer rims of adjacent fluid treatment elements may extend a short distance into the space, for example, as disclosed in U.S. Provisional Application No. 60/907,078 entitled Fluid Treatment Elements and Fluid Treatment Arrangements with Posts and/or Bands Between Fluid Treatment Elements and Methods for Making Them, which listed Thomas Welch, Jr., Stephen Geibel, and Tanweer ul Haq as an inventor and which was filed on Mar. 19, 2007, and the PCT International Application which claims priority based on this Provisional Application, both of which are incorporated by reference to support these and other features. However, at least about 75%, or at least about 85%, or at least about 90%, or at least about 95%, or about 100% of the space, by volume, is completely free of structure. Again, higher percentages are preferred for reasons similar to those previously explained.

Figure 7:
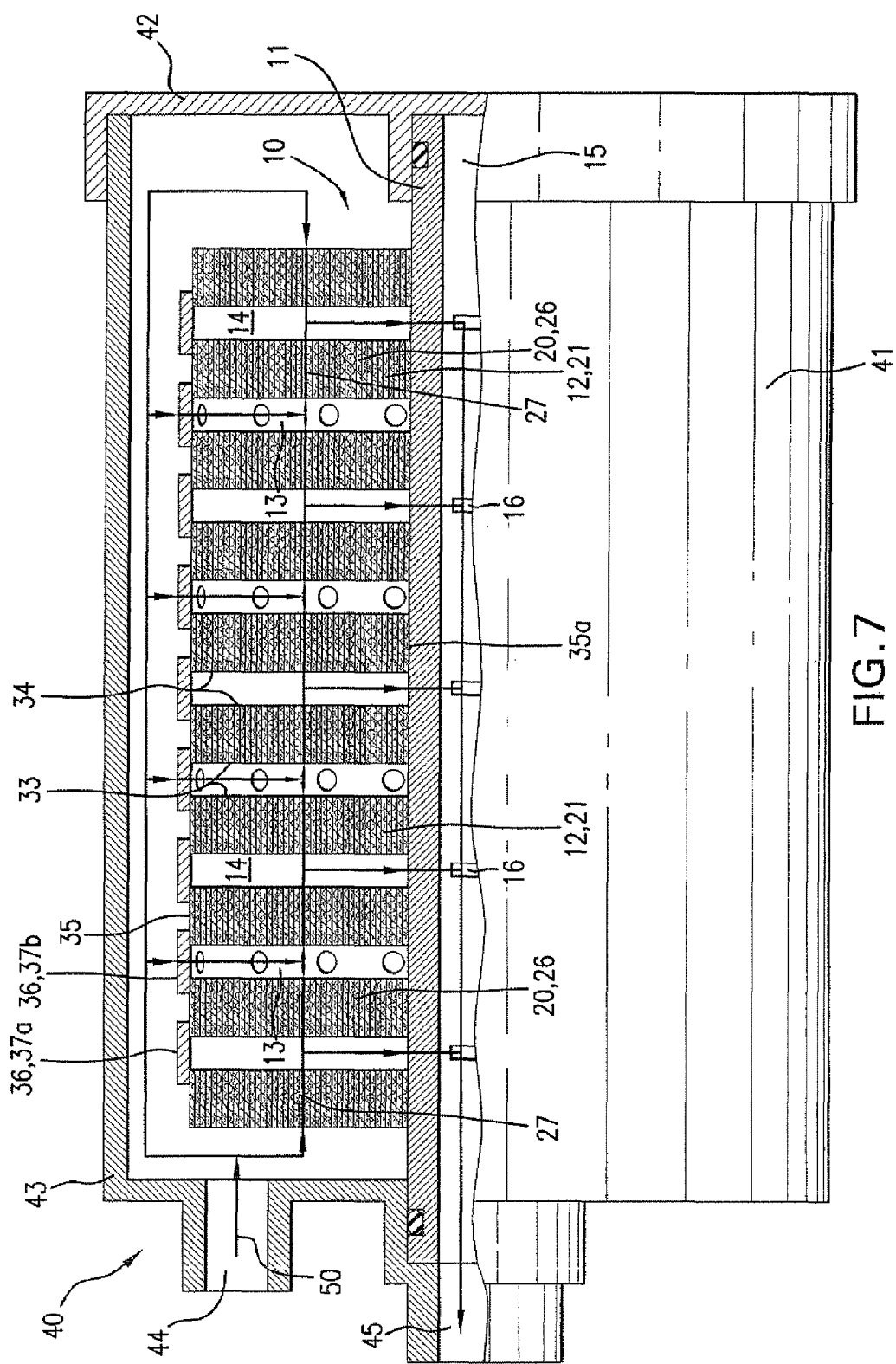
FIG. 7 is a quarter sectioned view of a fluid treatment assembly including a fluid treatment arrangement having a surround.

The fluid treatment arrangement may further include additional components, including, for example, a surround associated with the spaces to fluidly isolate one or more of the spaces, for example, from the exterior of the fluid treatment elements. The surround may be configured in a wide variety of ways, including, for example, as a component separate from but associated with the fluid treatment elements. One of many different examples of a surround 36 is shown in FIG. 7. The fluid treatment elements 12 and the core assembly 11 shown in FIG. 7 may be identical to those previously described, but neither the surround, the fluid treatment elements, nor the core assembly are limited to the features shown in FIG. 7. The illustrated surround 36 comprises a plurality of axially spaced bands 37a encircling the permeate spaces 14 and bridging the outer rims 35 of the fluid treatment elements 12 adjacent to each permeate space 14. The surround 36 may further comprise a plurality of axially spaced bands 37b encircling the feed spaces 13, bridging the outer rims 35 of the adjacent fluid treatment elements 12, and having openings that fluidly communicate between the feed spaces 13 and the exterior of the fluid treatment elements 12. For many embodiments, the bands 37a, 37b may span the spaces 14, 13 but may be arranged to leave at least a portion of the outer rims 25 of adjacent fluid treatment elements 12 exposed. For other embodiments the bands may span the spaces and completely cover the outer rims of adjacent fluid treatment elements or may span the spaces but not extend along the outer rims of adjacent fluid treatment elements. Alternatively, the surround may have any configuration that fluidly blocks the outer ends of at least some of the spaces, e.g., the permeate spaces, and allows fluid communication with other spaces, e.g., the feed spaces. For example, the surround may comprise a sleeve that encircles all of the spaces and the fluid treatment elements, or a helical wrap that is wrapped around all the spaces and the fluid treatment elements, fluidly blocking the outer ends of some of the spaces and having openings that allow fluid communication at the outer ends of other spaces, e.g., fluid communication between the outer rims and the exterior of the fluid treatment elements and other spaces. The surround may be sealed to the fluid treatment elements in a variety of ways and may be permeable or impermeable. For many embodiments, the surround 36 may be impermeable and may be bonded to the fluid treatment elements 12. For example, the bands 37 may comprise impermeable strips, e.g., impermeable polymeric strips, and may be adhesively bonded, solvent bonded, or heat bonded to the outer rims 35 of the fluid treatment elements 12. Alternatively, the bands may comprise a settable material such as a hot-melt adhesive, a polyurethane, or an epoxy. If the surround is permeable, it may have a permeability and/or removal rating which is substantially no greater than the permeability and/or removal rating edgewise through the strip of fluid treatment medium to prevent fluid from bypassing the fluid treatment elements. Consequently, a space is fluidly isolated from the interior of the core assembly or the exterior of the fluid treatment elements when all fluid flow paths between the space and the interior of the core assembly or between the space and the exterior of the fluid treatment elements are through a structure, such as the fluid treatment elements or a surround, which has a permeability and/or removal rating that is substantially no greater than the permeability and/or removal rating edgewise through the strip of the permeable fluid treatment medium.

Fluid treatment arrangements may be made in any of several different ways. According to one general example, a method for making a fluid treatment arrangement may comprise positioning at least first and second spirally wound, disk-shaped, fluid treatment elements along a hollow core assembly. The first and second fluid treatment elements may be axially separated from one another to define a space which extends between the first and second elements from the core assembly to the outer rims of the elements, and the space may be substantially free of structure.

The fluid treatment elements may be positioned along the core assembly in a variety of ways. For example, at least two and as many as at least 10 or more, or at least 25 or more, or at least 50 or more or at least 100 or more ribbons may be spirally wound in a plurality of windings around the core assembly to form fluid treatment elements at different axial locations along the core assembly. All of the fluid treatment elements may be separated by spaces, or some of the fluid treatment elements may be in contact side-by-side while other fluid treatment elements may be spaced from adjacent fluid treatment elements. All of the fluid treatment elements may have identical or similar treatment characteristics. Alternatively, the fluid treatment elements may have different treatment characteristics, for example, as disclosed in U.S. Provisional Application No. 60/907,069 entitled Fluid Treatment Elements and Fluid Treatment Arrangements with Fluid Treatment Elements Having Different Fluid Treatment Characteristics and Methods for Making and Using Them, which listed Thomas Welch, Jr., Mark Hurwitz, Tanweer ul Haq, and Joseph Verschneider as inventors and which was filed on Mar. 19, 2007, and the PCT International Application which claims priority based on this Provisional Application, both of which are incorporated by reference to support these and other features.

The ribbons may be wound around the core assembly one at a time, several at a time, or all at the same time, e.g. either sequentially or simultaneously. The inner end region of the ribbon, e.g., the region defining the first one, two, or three windings, may be sufficiently sealed against the core assembly to prevent bypass of the fluid treatment element. For example, the inner end region may be fixed to the core assembly by heat bonding, adhesively bonding, or solvent bonding the inner end region to the core assembly. Alternatively, the inner end region may not be bonded to the core assembly but may, for example, be compressively fit against the core assembly by tightly winding the initial windings around the core assembly. Further, the inner end region may have a tapered thickness or may be sufficiently tightly wound that no step is formed at the transition between the end of the first winding and the beginning of the second winding.

Each ribbon may be spirally wound in a plurality of windings under tension to form a fluid treatment element of any desired radial dimension. The tension may be constant or may vary with increasing radius of the fluid treatment element, and the tension may be empirically selected based on many factors. For example, a maximum tension at which the ribbon detrimentally elongates, e.g., the tension at which the fluid treatment medium unduely stretches or begins pulling apart, may be determined. The ribbon may then be spirally wound using a tension less than the maximum tension, for example, no greater than about 80% or no greater than about 65% or no greater than about 50% of this maximum tension. Further, the ribbon may be spirally wound using a tension which provides similar compression, e.g., substantially uniform compression, of the fluid treatment medium from one winding to the next along most or all of the radial dimension of the fluid treatment element. By providing similar compression from one winding to the next, the fluid treatment element may more evenly treat the fluid flowing edgewise through the plurality of windings of the fluid treatment medium. For example, if the fluid treatment medium comprises a filter medium, the fluid treatment element may be more uniformly loaded along the radial dimension of the element, increasing the dirt capacity and/or the service life of the element. In addition, the ribbon may be spirally wound with sufficient tension to inhibit or prevent the flow of fluid laterally between adjacent surfaces of adjacent windings and adjacent layers of the ribbon. For example, the ribbon may be spirally wound with sufficient tension that substantially no fluid passes laterally between the adjacent surfaces and adjacent layers or with sufficient tension that any fluid pathway laterally between the adjacent surfaces and adjacent layers of the ribbon has a permeability and/or a removal rating which is not substantially greater or coarser than the permeability and/or removal rating of the fluid pathway edgewise through the fluid treatment medium. The ribbon may also be wound with sufficient tension to form a substantially self-supporting fluid treatment element having a stable, firm disk-shaped body. For example, the ribbon may be wound with sufficient tension to hold adjacent windings and adjacent layers against each other tightly enough to prevent lateral slippage and/or radial separation of the adjacent windings and adjacent layers at the differential pressures encountered by the fluid treatment element.

After each ribbon has been spirally wound to a desired radial dimension, the outer end region of the ribbon may be held in place in any of numerous ways. For example, the outer end region may be bonded to the adjacent winding for example, by heat bonding, adhesive bonding, or solvent bonding. Alternatively or additionally, the outer end region of the ribbon may be staked to other windings. For example, a hot, metal pin may be inserted generally radially through the outer end region of the ribbon and the outer windings, melting the portions of the ribbon that contact the pin. When the pin is withdrawn, the molten portions solidify with one another, forming a generally radial stake which holds the outer end region, including any multiple layers of the ribbon, and the outer windings in place. Alternatively or additionally, a hollow needle, which may or may not be hot, may be inserted generally radially through the outer end region and the outer windings or in the space between adjacent windings. A liquid settable bonding composition or material, including, for example, a polyurethane, an epoxy, or a hot melt adhesive, may be injected into the windings as the needle is withdrawn, forming a generally radial stake which holds the outer end region and the windings in place. As yet another alternative, a stake, for example, in the form of a weld bead or a bead of settable bonding material, may be drawn along one or both side edges of the outer end region of the ribbon and the outer windings.

The stability of a spirally wound fluid treatment element may be further enhanced by staking much or all of the disk-shaped body. For example, generally radially extending stakes may be formed through most or substantially all of the windings and/or at various angularly-spaced positions around the disk-shaped body. Similarly, stakes may be applied along one or both end surfaces of the fluid treatment element and/or at various angularly-spaced positions around each surface. Each stake may extend mostly or completely through or along the fluid treatment element, e.g., to the core assembly, fixing the fluid treatment to the core assembly.

The stability of a spirally wound fluid treatment element may also be enhanced by bonding adjacent windings, and/or adjacent layers of the ribbon, to one another continuously or intermittently along the length of the spirally wound ribbon. Adjacent windings and/or layers may be bonded in a variety of ways. For example, the ribbon may include a bonding layer, as previously described. The bonding layer may comprise an adhesive which bonds adjacent windings and/or layers as the ribbon is spirally wound. Alternatively, the bonding layer may be activated by applying a solvent or heat to the fluid treatment element after the element is formed. As yet another alternative, a hot melt adhesive or a heat bond may be applied, for example, intermittently, between adjacent windings and/or layers as the ribbon is spirally wound.

The fluid treatment elements may be positioned along the core assembly with spaces between many, most, or substantially all of the elements. Some of the spaces may be positioned in fluid communication with the openings in the core assembly and other spaces may be fluidly isolated from the interior of the core assembly. Before, while, or after the fluid treatment elements are positioned along the core assembly, structures may be inserted in some of the spaces between the elements. For example, some of the spaces may be occupied to a small extent by posts or bands. However, many, most, or substantially all of the spaces may remain substantially free of structure, including, for example, many of the feed spaces and/or many of the permeate spaces. Having many of the spaces substantially free of structure greatly reduces the complexity of manufacture, as no extra steps are required to place any structure within the spaces. This, in turn, reduces the cost of manufacture as well as the cost of materials associated with the fluid treatment arrangements.

The surround may be coupled to the fluid treatment elements and the spaces in a variety of ways. For example, a surround comprising a plurality of bands may be positioned around the spaces, including spaces substantially free of structure, and the bands may be sealed to the adjacent fluid treatment elements, e.g., at the outer rims. Alternatively, a surround comprising a sheet spanning the fluid treatment elements and spaces may be wrapped circumferentially around the elements and spaces and formed into a sleeve, or a surround comprising a preformed sleeve may be slid axially over the fluid treatment elements and spaces. The sleeve may be sealed to fluid treatment elements, e.g., at the outer rims. Openings may be formed in the sleeve which allows the spaces that are fluidly isolated from the core assembly to fluidly communicate with the exterior of the fluid treatment elements. As yet another alternative, a surround comprising a wide strip may be helically wound around the fluid treatment elements and the spaces with adjacent helical windings overlapping one another. The wrap may be sealed to the fluid treatment elements, and openings may be formed in the wrap which allows the spaces that are fluidly isolated from the core assembly to fluidly communicate with the exterior of the fluid treatment elements.

After the fluid treatment arrangements are formed, they may be contained within a wide variety of housings to provide fluid treatment assemblies. The fluid treatment assembly may comprise a housing containing only a single fluid treatment arrangement or a housing containing multiple fluid treatment arrangements arranged serially or in parallel within the housing. For example, the housing may include one or more tube sheets and multiple fluid treatment arrangements may be associated with the tube sheets. The housing may permanently contain the fluid treatment arrangement, e.g., forming a disposable fluid treatment arrangement, or the housing may removably contain the fluid treatment arrangement, allowing a used fluid treatment arrangement to be replaced by a new fluid treatment arrangement in a reusable housing.

The housing may be formed from any impermeable material, e.g., a metallic material or a polymeric material, which is compatible with the process parameters, e.g., the pressure and temperature and chemical composition of the fluid. The housing may have two or more principle ports, e.g., a process or feed fluid inlet port and a filtrate or permeate outlet port. The housing may define a fluid flow path between the ports, and the fluid treatment arrangement may be positioned in the housing in the fluid flow path. The ports may be situated on the housing in any of numerous configurations, including an in-line configuration, a T-type configuration, or an L-type configuration, and the ports may comprise any of a wide variety of fittings. The housing may further include additional ports, including, for example, a retentate or concentrate outlet port and one or more ports associated with draining, venting, or cleaning, e.g., backwashing.

One of many examples of a fluid treatment assembly 40 and a housing 41 containing at least one fluid treatment arrangement 10 is shown in FIG. 7, but fluid treatment assemblies and housings are not limited to the features illustrated in FIG. 7. The housing 41 may include a cover 42 and a shell 43. The cover 42 may be permanently or removably mounted to the shell 43 at one end of the shell 43. The other end of the shell 43 may have a feed inlet port 44, e.g., an off center feed inlet port, and a permeate outlet port 45, e.g., a central permeate outlet port. The illustrated embodiment of the fluid treatment assembly 40 has only two ports 44, 45 and they are located on one end of the housing 41. Other embodiments may include more than two ports and the ports may be located anywhere along the housing, e.g., at both ends and/or in the side of the housing. The fluid treatment arrangement 10 may be sealed within the housing 41 across a fluid flow path 50 between the feed inlet port 44 and the permeate outlet port 45 with the shell 43 surrounding the fluid treatment elements 12. For example, one end of the hollow core assembly 11 may be blindly sealed against the cover 42. The opposite end of the hollow core assembly 11 may be open and sealed to the shell 43 at the permeate outlet port 45, allowing fluid communication between the interior 15 of the core assembly 11 and the permeate outlet port 45. For many embodiments, none of the fluid treatment elements 12 may be sealed to the housing 41. For example, only the core assembly 11 may be sealed to the housing 41, minimizing seals and providing a highly reliable fluid treatment assembly.

Fluids may be treated in any of numerous ways by fluid treatment assemblies, arrangements, and elements embodying the invention. In one mode of operation, a feed fluid may be directed between the exterior of a fluid treatment arrangement and the interior of a core assembly. The fluid passes generally edgewise through the windings of a spirally wound ribbon including a strip of a permeable fluid treatment medium, where the fluid is treated in any of a variety of ways. The fluid also passes through a space which is substantially free of structure and which is adjacent to the spirally wound ribbon. In the illustrated fluid treatment assembly 40, the feed fluid is directed along the fluid flow path 50 outside-in through the fluid treatment arrangement 10 from the exterior of the fluid treatment elements 12 to the interior 15 of the core assembly 11. However, in other embodiments the feed fluid may be directed inside-out through the fluid treatment arrangement from the interior of the core assembly to the exterior of the fluid treatment elements.

In the embodiment of FIG. 7, the feed fluid may enter the housing 41 through the feed inlet port 44 and follow the fluid flow path 50 to the permeate outlet port 45. From the feed inlet port 44, the feed fluid may flow generally axially along the housing 41 between the exterior of the fluid treatment elements 12 and the interior of the shell 43. The feed fluid then flows generally radially inwardly into the feed spaces 13 between the feed surfaces 33 of the fluid treatment elements 12. Many, most, or substantially all of the feed spaces 33 may be substantially free of structure. From the feed spaces 13, the feed fluid may flow generally axially into the feed surfaces 33 of the fluid treatment elements 12 and through the disk-shaped bodies 21 of the fluid treatment elements 12.

Most or substantially all of the fluid flowing along the fluid flow path 50 axially through each fluid treatment element 12 may flow along the fluid pathway 27 through the ribbon 20, including the fluid treatment medium 26, of each winding from the feed side edge 24, 24a to the permeate side edge radially 25, 25a. Fluid may also flow from the permeable fluid treatment medium of one winding radially into and then laterally along the permeable medium of one or more adjacent or nearby windings. As the fluid flows through the fluid treatment medium 26, it may be treated in any of numerous ways, depending, for example, on the nature of the fluid treatment medium. The treated fluid emerges from the permeate surfaces 34 of the fluid treatment elements 12 and flows into the permeate spaces 14 between the permeate surfaces 34 of the fluid treatment elements 12. Many, most, or substantially all of the permeate spaces 34 may be substantially free of structure. From the permeate spaces 14, the treated fluid may flow generally radially inwardly through the openings 16 into the interior 15 of the core assembly 11. The treated fluid then flows axially along the interior 15 of the core assembly 11 to and through the permeate outlet port 45 of the housing 41.

Many advantages are associated with fluid treatment assemblies and arrangements embodying one or more aspects of the invention. For example, by providing spaces, e.g., feed spaces 13, permeate spaces 14, or both feed and permeate spaces 13, 14, which are substantially free of structure, there is less resistance to fluid flow through these spaces, which can enhance the performance of the fluid treatment arrangement. For example, the fluid flow rate may be higher for any given pressure drop specified for the fluid treatment arrangement, or the pressure drop may be lower for any given flow rate specified for the fluid treatment arrangement. By providing end surfaces of the fluid treatment elements which open directly onto the spaces, the resistance to fluid flow may be reduced even further. Further, because there is less structure in fluid treatment assemblies and arrangements embodying the invention, there is less waste to dispose of when the fluid treatment assemblies and arrangements are spent. This is especially important if the spent assemblies and arrangements comprise hazardous waste. Consequently, embodiments of the invention provide fluid treatment assemblies and arrangements that are more economical, more effective, and less environmentally detrimental.

In addition, spirally winding separate ribbons to separately form each of the plurality of fluid treatment elements facilitates manufacturing different configurations of fluid treatment arrangements and elements. The radial dimension of each element may be easily varied by winding more or less of the ribbon around the core assembly; the number of fluid treatment elements provided along the core assembly can be easily varied by winding more or fewer ribbons around the core assembly; and the location of the fluid treatment elements along the core assembly can be easily varied by simply adjusting the spacing between the ribbons being wound around the core assembly. Further, the ribbons may be spirally wound around the core assembly very quickly, speeding manufacture. Using a plurality of separate, narrow ribbons instead of, for example, a single, wide sheet with slots or other through holes in the sheet may then significantly enhance the flexibility and efficiency of manufacture, allowing fluid treatment arrangements with various numbers of elements and spacings between elements to be made without having to change out sheets of different widths or different through hole configurations. In addition, if a defect such as a hole or tear in the permeable fluid treatment medium occurs during manufacture, only the defective ribbon may be replaced rather than an entire sheet, allowing for faster and more efficient production.

While various aspects of the invention have been previously described and/or illustrated with respect to several embodiments, the invention is not limited to these embodiments. For instance, one or more features of these embodiments may be eliminated without departing from the scope of the invention. For example, as previously described, the surround 36 may include one or more bands 37b that encircle the feed spaces 13 and have openings that fluidly communicate between the exterior of the fluid treatment elements 12 and the feed spaces 13. These bands 37b may be entirely eliminated without departing from the scope of the invention. The feed spaces may simply open onto the exterior of the fluid treatment elements.

Figure 8:
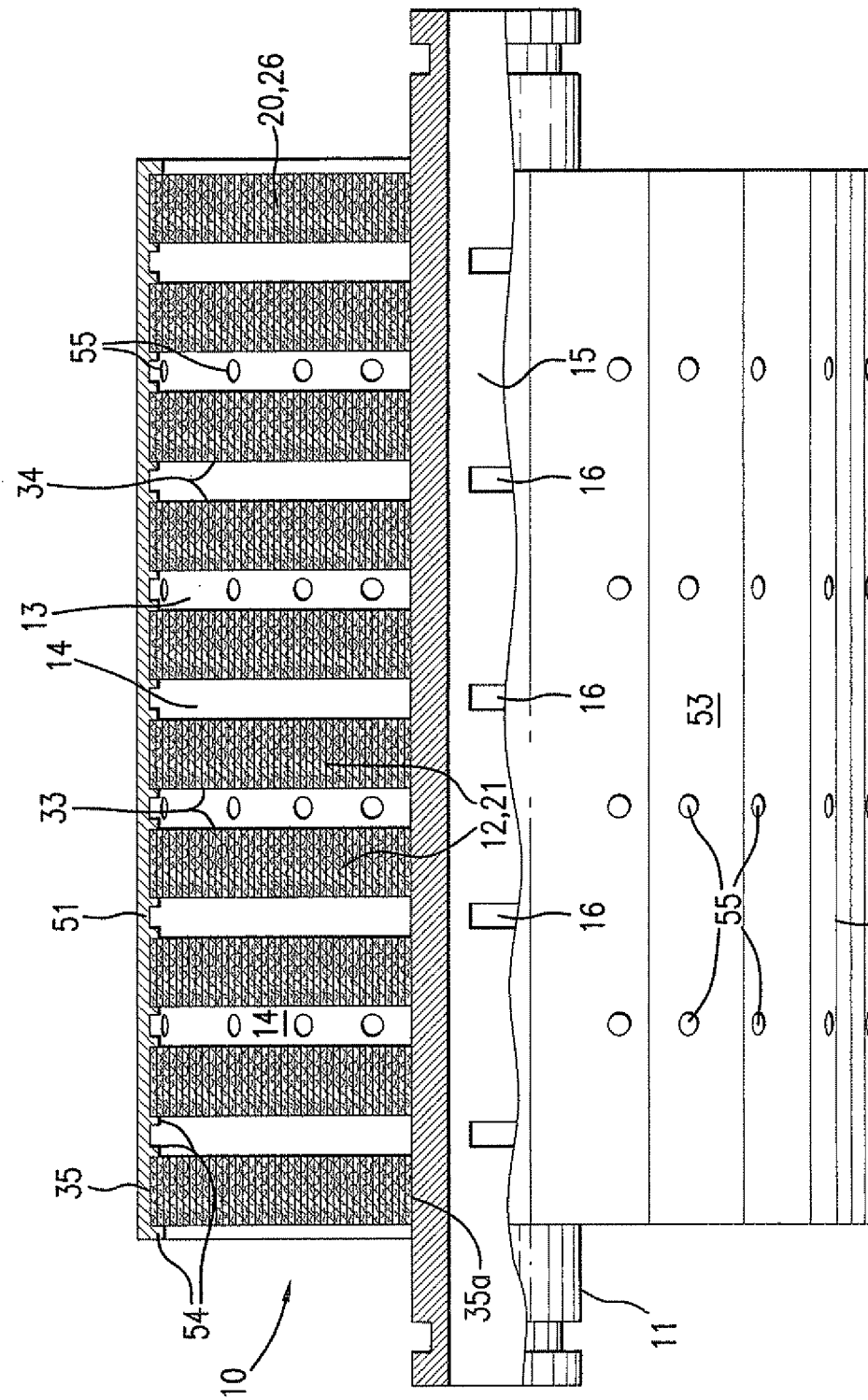
FIG. 8 is a quarter sectioned view of another fluid treatment arrangement.

Further, one or more features of an embodiment may be modified, or one or more features of any embodiment may be combined with one or more features of other embodiments, without departing from the scope of the invention. For example, the surround may comprise a more rigid structure to provide additional support at the outer rims of the fluid treatment elements. In one embodiment, the surround 36 may comprise semi-cylindrical sections 51, 52 which may be joined to form a more rigid cage 53, as shown in FIG. 8. The fluid treatment elements 12 and the core assembly 11 shown in FIG. 8 may be identical to those previously described, but neither the surround, the fluid treatment elements, nor the core assembly are limited to the features shown in FIG. 8. Each fluid treatment element 12 may comprise a spirally wound ribbon 20 which includes a strip of a fluid treatment medium 26. The sections 51, 52 of the surround 36 may be fitted around the outer rims 35 of the fluid treatment elements 12 and permanently or removably joined to one another to form the cage 53. The outer rims 35 of the disk shaped bodies 21 of the fluid treatment elements 12 may be sealed against the cage 53 in a variety of ways. For example, the outer rims 35 may be adhesively bonded or heat bonded to the cage 53. Alternatively or additionally, the outer rims 35 may be sealed against the cage 53 by a tight mechanical fit. For example, a pair of circumferential ribs 54 may extend inwardly a short distance from each section 51, 52 and may be spaced apart a distance equal to or slightly less than the width of the outer rim 35 of each fluid treatment element 12. The sections 51, 52 may be fitted around the fluid treatment arrangement 10 with each outer rim 35 fitting between a corresponding pair of ribs 54. The cage 53 may include openings 55 that allow some of the spaces, e.g., the feed spaces 13, to fluidly communicate with the exterior of the fluid treatment elements 12. The cage 53 may fluidly isolate other spaces, e.g., the permeate spaces 14, from the exterior of the fluid treatment elements 12.

Figure 9:
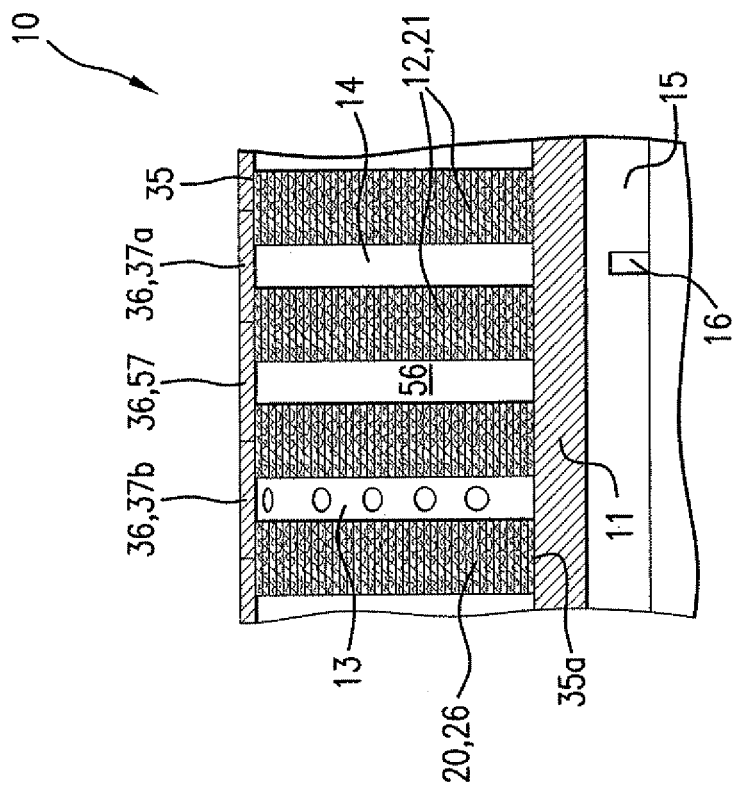
FIG. 9 is a sectioned view of a portion of a fluid treatment arrangement.

As another example, some of the spaces between adjacent fluid treatment elements may be arranged to be fluidly isolated from both the interior of the core assembly and the exterior of the fluid treatment elements. A portion of a fluid treatment arrangement 10 including fluid treatment elements 12 and a core assembly 11 is shown in FIG. 9. The fluid treatment elements 12 and the core assembly 11 illustrated in FIG. 9 may be identical to those previously described, but neither the fluid treatment arrangement, the fluid treatment elements, the core assembly, nor the surround are limited to the features shown in FIG. 9. Each fluid treatment element 12 may comprise a ribbon 20, including a fluid treatment medium 26, which is spirally wound to form a disk-shaped body 21. The fluid treatment arrangement 10 may include an intermediate space 56 positioned between a feed space 13 and a permeate space 14. The intermediate space 56 may be fluidly isolated from the interior 15 of the core assembly 11 by a solid wall portion of the core assembly 11 and may be fluidly isolated from the exterior of the fluid treatment elements 12 by the surround 36. In addition to a band 37a encircling the permeate spaces 14 and a band 37b having openings and encircling the feed spaces 13, the surround 36 may include a band 57, such as an impermeable, imperforate band 57, which encircles the intermediate space 56 and is sealed to the outer rims 35 of the adjacent fluid treatment elements 12. At least the permeate space bands 37a and the intermediate space bands 57 may axially abut one another. The intermediate space may or may not be substantially free of structure and may or may not include a functional material. Fluid may flow generally radially into a feed space 13; generally axially through one fluid treatment element 12, the intermediate space 56, and an adjacent fluid treatment element 12 to a permeate space 14; and then generally radially out of the permeate space 14 through the opening 16 into the interior 15 of the core assembly 11.

As yet another example, fluid treatment elements may be positioned along the core assembly by sliding preformed elements generally axially along the core assembly. For example, each ribbon may be spirally wound in a plurality of windings to a desired radial dimension around a central hub, rather than around the core assembly, to form a fluid treatment element. The preformed fluid treatment elements may then be slid axially, with or without the hub, along the core assembly to the desired locations and fixed in place.

Further, embodiments having different features may nonetheless be within the scope of the invention. For example, each ribbon may be spirally wound around a hub to form a fluid treatment element. Each hub may comprise a section of the core assembly, and the hub sections of adjacent elements may be connected to one another to form the hollow core assembly and the fluid treatment arrangement. The hub sections may be mechanically coupled to one another and/or bonded to one another, and some of the hub sections may include openings which allow fluid communication with the interior of the core assembly.

As another example, a sheet assembly may comprise a sheet of the porous fluid treatment medium as the sole component or as one layer of a multilayer composite, e.g., similar to the multilayer composite of the ribbon. The sheet assembly may be spirally wound in a plurality of windings to form a roll having a desired radial dimension. Sections having a desired width may then be cut, e.g., sliced, from the roll in a direction perpendicular to the axis of the roll to form the fluid treatment elements. The fluid treatment elements may then be positioned along a core assembly, e.g., by axially sliding the preformed elements along the core assembly, or the fluid treatment elements may be positioned on hub sections and the hub sections may be connected to one another to form fluid treatment arrangement including the hollow core assembly.

As yet another example, a fluid treatment arrangement may include multiple sets, e.g., two, three, four or more sets, of fluid treatment elements which are mounted along the core assembly radially displaced from one another, for example, in a manner similar to that disclosed in U.S. Provisional Application No. 60/907,066 entitled Fluid Treatment Arrangements with Sets of Fluid Treatment Elements and Methods for Making and Using Them, which listed Thomas Welch, Jr., Tanweer ul Haq, and Joseph Verschneider as an inventor and which was filed on Mar. 19, 2007, and the PCT International Application which claims priority based on this Provisional Application, both of which are incorporated by reference to support these and other features. Each set may include a plurality of fluid treatment elements, each element including a ribbon which is spirally wound in a plurality of windings to form a generally disk-shaped body having a radial dimension. The outer set of fluid treatment elements may overlie the inner set of fluid treatment elements with the elements of the inner and outer sets radially and/or axially aligned or offset. For example, the elements of the outer set may bridge at least some of the spaces between the elements of the inner set. Further, the size, e.g., the width and radial dimension, and/or the treatment characteristics of the outer set of fluid treatment elements may be the same as or different from those of the inner set of fluid treatment elements.

Figure 10:
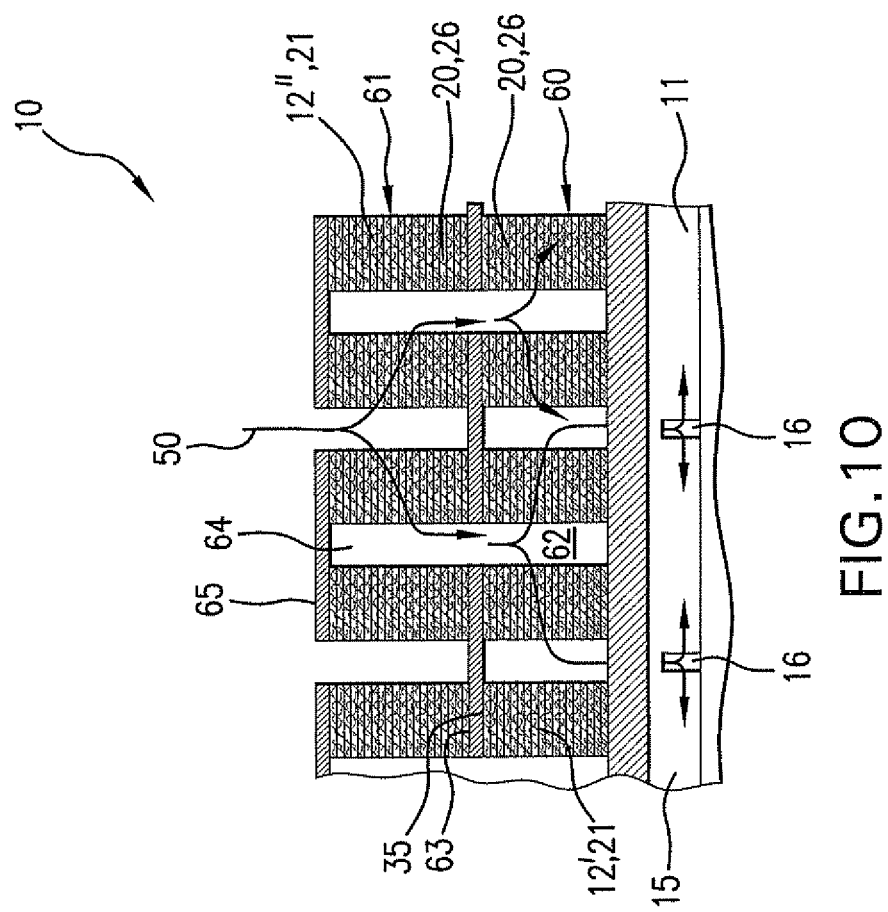
FIG. 10 is a sectioned view of a portion of another fluid treatment arrangement.

In the embodiment shown in FIG. 10, a fluid treatment arrangement 10 may include at least inner and outer sets 60, 61 of fluid treatment elements 12',12" mounted along a core assembly 11. Each fluid treatment element 12', 12" of each set 60, 61 may comprise a ribbon 20, including a fluid treatment medium 26, which is spirally wound to form a disk-shaped body 21. The inner set 60 of fluid treatment elements 12' may be positioned along and immediately circumjacent to the core assembly 11 as previously described with spaces 62 between at least some or all of the adjacent inner fluid treatment elements 12'. An inner surround comprising, for example, a plurality of inner bands 63, may bridge at least some of the inner spaces 62 between adjacent inner fluid treatment elements 12'. The inner bands 63 may also seal the outer rims 35 of the inner elements 12'. The features of the core assembly 11, the fluid treatment elements 12' of the inner set 60, the inner spaces 62 and the inner bands 63 may be similar to those previously described. In particular, many or all of the inner spaces 62 may be substantially free of structure.

Radially displaced from the inner set 60 of fluid treatment elements 12', the outer set 61 of fluid treatment elements 12" may be positioned along the core assembly 11 with spaces 64 between at least some or all of the outer fluid treatment elements 12". The outer fluid treatment elements 12" may be spirally wound around the inner fluid treatment elements 12' and/or the inner surround, e.g., the inner bands 63. The inner end region of the ribbon of each outer fluid treatment element 12" may be sealed against the inner fluid treatment elements 12' or the inner bands 63 as previously described for the inner end region of the ribbon of each fluid treatment element 12 and the core assembly 11. The size of each outer fluid treatment element 12" may be the same as or different from the size of each inner fluid treatment element 12'. An outer surround comprising, for example, a plurality of outer bands 65, may bridge at least some of the outer spaces 64 between adjacent outer fluid treatment elements 12". The features of the fluid treatment elements 12", the outer spaces 64, and the outer bands 65 may be similar to those previously described. In particular, many or all of the outer spaces 64 may be substantially free of structure.

The inner and outer sets of fluid treatment elements and the inner and outer surrounds may be arranged to direct fluid in series and/or in parallel axially through one or more outer fluid treatment elements and axially through one or more inner fluid treatment elements as the fluid flows from the exterior of the fluid treatment arrangement to the interior of the core assembly or vice versa. For example, in the embodiment of FIG. 10, some of the outer spaces 64 may be open to the exterior of the fluid treatment arrangement 10 and closed along the inner diameter of the outer elements 12" by the inner bands 63. Other outer spaces 64 may be isolated from the exterior of the fluid treatment arrangement 10 by the outer bands 65 and open to the inner spaces 62 along the inner diameter of the outer elements 12". The inner spaces 62 which open onto the outer spaces 64 may be closed along the inner diameter of the inner fluid treatment elements 12' by a solid wall of the core assembly 11. The inner spaces 62 which are closed by the inner bands 63 may open into the interior 15 of the core assembly 11 though the openings 16 in the core assembly 11.

Fluid treatment arrangements having multiple, radially displaced sets of fluid treatment elements may be contained within a wide variety of housings to provide fluid treatment assemblies, as previously described for the embodiments of FIGS. 1-9.

In one mode of operation feed fluid may be directed through the fluid treatment arrangement 10 along a fluid flow path 50 between the exterior of the fluid treatment arrangement 10 and the interior 15 of the core assembly 11. For example, in the embodiment of FIG. 10, feed fluid may be directed generally radially into the open outer spaces 64, further radial flow being blocked by the inner bands 63. From the open outer spaces 64 the feed fluid may flow generally axially through the outer fluid treatment elements 12" into the outer spaces 64 that are isolated from the exterior of the fluid treatment arrangement 10 by the outer bands 65. As the fluid flows axially through the outer fluid treatment elements 12", the fluid may pass generally edgewise through the ribbon 20, including the fluid treatment medium 26, of each winding. The fluid may also flow from the permeable fluid treatment medium of one winding radially into and then laterally along the permeable medium of one or more adjacent windings. As the fluid flows through the outer fluid treatment elements 12", the fluid is treated. From the isolated outer spaces 64, the fluid may flow generally radially into the inner spaces 62 that open onto the outer spaces 64, further radial flow being blocked by the solid wall of the core assembly 11. From these inner spaces 62, the fluid may flow generally axially through the inner fluid treatment elements 12' into the inner spaces 62 that are isolated from the outer spaces 64 by the inner bands 63. As fluid flows axially through the inner fluid treatment elements 12', the fluid may pass generally edgewise through the ribbon 20, including the fluid treatment medium 26, of each winding. The fluid may also flow from the permeable fluid treatment medium of one winding radially into and then laterally along the permeable medium of one or more adjacent windings. As the fluid flows through the inner fluid treatment elements 12', the fluid is again treated. The fluid treatment elements 12', 12" of the inner and outer sets 60, 61 may have identical or similar treatment characteristics or they may have different treatment characteristics and the fluid may be treated accordingly. From the inner spaces 62 which are isolated from the outer spaces 64, the fluid may flow generally radially through the openings 16 into the interior 15 of the core assembly 11. Because the inner and outer spaces 62, 64 may be substantially free of structure, there can be less resistance to fluid flow through these spaces as the fluid passes between the exterior of the fluid treatment arrangement 10 and the interior 15 of the core assembly 11.

The present invention is thus not restricted to the particular embodiments which have been described and/or illustrated herein but includes all embodiments and modifications that may fall within the scope of the claims.

The invention claimed is:

1. A fluid treatment arrangement comprising:
a hollow core assembly having an interior and an axis;
first and second adjacent fluid treatment elements mounted along the core assembly, the first fluid treatment element being axially separated from the second fluid treatment element and defining a space between them, wherein each fluid treatment element includes a ribbon which has a permeable fluid treatment medium and is spirally wound in a plurality of windings to define a generally disk-shaped body having a radial dimension, a first end surface on one side of the body, a second end surface on the other side of the body, and an outer rim, wherein an end surface of each fluid treatment element opens directly onto the space, wherein the space extends between the first end surfaces of the first and second fluid treatment elements along at least about 85% of the radial dimension of the first and second fluid treatment elements and is substantially free of structure, wherein the ribbons of the first and second adjacent fluid treatment elements are separate from one another, each ribbon having opposite major surfaces and being free of any through holes or slots extending between the opposite major surfaces, and wherein the first end surfaces of the first and second fluid treatment elements have no points of contact between them; and a fluid pathway which extends between the first and second end surfaces of each fluid treatment element generally edgewise through the permeable fluid treatment medium to or from the space.

2. The fluid treatment arrangement of claim 1 wherein the ribbon of at least one of the first and second fluid treatment elements includes first and second coplanar strips of permeable fluid treatment media arranged side-by-side.

3. The fluid treatment arrangement of claim 1 further comprising a surround which encircles the space and fluidly blocks an outer end of the space.

4. A fluid treatment assembly comprising a housing and a fluid treatment arrangement of claim 1 disposed inside the housing, wherein the housing has first and second ports and defines a fluid flow path between the first and second ports, the fluid treatment arrangement being positioned in the housing across the fluid flow path.

5. A fluid treatment arrangement comprising:
a hollow core assembly having an interior and an axis;
first, second, and third fluid treatment elements mounted along the core assembly, wherein the first fluid treatment element is adjacent to and axially separated from the second fluid treatment element, defining a first space between them, and the second fluid treatment element is adjacent to and axially separated from the third fluid treatment element, defining a second space between them, wherein each fluid treatment element includes a ribbon which has a permeable fluid treatment medium and is spirally wound in a plurality of windings to define a generally disk-shaped body having a first end surface on one side of the body, a second end surface on the other side of the body, and an outer rim, wherein the first space extends between the first end surfaces of the first and second fluid treatment elements along at least about 85% of the distance from the core assembly to the outer rims of the first and second fluid treatment elements, wherein the second space extends between the second end surfaces of the second and third fluid treatment elements along at least about 85% of the distance from the core assembly to the outer rims of the second and third fluid treatment elements, wherein the first and second spaces are substantially free of structure, wherein the ribbons of the first, second, and third fluid treatment elements are separate from one another, each ribbon having opposite major surfaces and being free of any through holes or slots extending between the opposite major surfaces, and wherein the first end surfaces of the first and second fluid treatment elements have no points contact between them and the second end surfaces of the second and third fluid treatment elements have no points of contact between them; and a fluid pathway which extends between the first and second spaces generally edgewise through the fluid treatment medium of at least the second fluid treatment element.

6. The fluid treatment arrangement of clam 5 wherein the first space is fluidly isolated from the exterior of the fluid treatment elements and fluidly communicates with the interior of the core assembly and the second space fluidly communicates with the exterior of the fluid treatment elements and is fluidly isolated from the interior of the core assembly.

7. The fluid treatment arrangement of claim 5 further comprising a surround which encircles the first space and is sealed to the outer rims of the first and second fluid treatment elements, the surround blocking an outer end of the first space.

8. A fluid treatment assembly comprising a housing and a fluid treatment arrangement of claim 5 disposed inside the housing, wherein the housing has first and second ports and defines a fluid flow path between the first and second ports, the fluid treatment arrangement being positioned in the housing across the fluid flow path.

9. A fluid treatment arrangement comprising:
a hollow core assembly having an interior and an axis;
a plurality of disk-shaped fluid treatment elements, wherein each fluid treatment element includes a ribbon which has at least one strip of a permeable fluid treatment medium having first and second opposite side edges, wherein the ribbon is spirally wound in a plurality of windings and defines a first axially-facing end surface comprising a plurality of windings of the first side edge of the permeable fluid treatment medium strip, a second axially-facing end surface comprising a plurality of windings of the second side edge of the permeable fluid treatment medium strip, and an outer rim, wherein the plurality of fluid treatment elements are positioned along the core assembly with the adjacent fluid treatment elements axially separated from one another and defining a plurality of first spaces and a plurality of second spaces, each first space extending between the first end surfaces of adjacent fluid treatment elements along at least about 85% of the distance from the core assembly to the outer rims of the adjacent fluid treatment elements, wherein each first end surface opens directly onto a first space, and each second space extending between the second end surfaces of adjacent fluid treatment elements along at least about 85% of the distance from the core assembly to the outer rims of the adjacent fluid treatment elements, wherein each second end surface opens directly onto a second space, wherein each of the first and second spaces is substantially free of structure, wherein the ribbons of the plurality of fluid treatment elements are separate from one another, each ribbon having opposite major surfaces and being free of an through holes or slots extending, between the opposite major surfaces, and wherein the first end surfaces of the adjacent fluid treatment elements have no points of contact between them and the second end surfaces of the adjacent fluid treatment elements have no points of contact between them; and a surround positioned around each first space at the outer rims of the adjacent fluid treatment elements to fluidly isolate an outer end of the first spaces.

10. A fluid treatment assembly comprising a housing and a fluid treatment arrangement of claim 9 disposed in the housing, wherein the housing has first and second ports and defines a fluid flow path between the first and second ports, the fluid treatment arrangement being positioned in the housing across the fluid flow path.

11. A method for making a fluid treatment arrangement comprising:
spirally winding a first ribbon which includes a permeable fluid treatment medium in a plurality of windings to form a first fluid treatment element having a first end surface, and spirally winding a separate second ribbon which includes a permeable fluid treatment medium in a plurality of windings to form a second fluid treatment element having a first end surface, each ribbon having opposite major surfaces and being free of any through holes or slots extending between the opposite major surfaces;
positioning the first and second spirally wound, disk-shaped fluid treatment elements along a hollow core assembly axially separated from one another to define a space which extends between the first end surfaces of the first and second fluid treatment elements along at least about 85% of the radial dimensions of the first and second fluid treatment elements and which is substantially free of structure, the first end surfaces of the first and second fluid treatment elements having no points of contact between them; and
sealing the space substantially free of structure between the outer rims of the first and second fluid treatment elements.

12. The method of claim 11 wherein spirally winding the first ribbon, spirally winding the second ribbon, and positioning the first and second fluid treatment elements around the core assembly include spirally winding the first ribbon around the core assembly at a first location along the core assembly and spirally winding the second ribbon around the core assembly at a second location along the core assembly.

13. A method of treating a fluid comprising:
directing a fluid between the exterior of a fluid treatment arrangement and the interior of a core assembly, including passing the fluid through first and second adjacent fluid treatment elements and a space between the first and second fluid treatment elements, passing the fluid through the fluid treatment elements including passing the fluid generally edgewise through windings of separate spirally wound ribbons, each ribbon having no through holes or slots extending between major surfaces of the ribbon and including a strip of a permeable fluid treatment medium, from a first end surface of each fluid treatment element to an opposite second end surface facing the space, the second end surfaces have no points of contact, wherein the fluid is treated by the permeable fluid treatment medium, and wherein passing the fluid through the space includes passing the fluid through a space substantially free of structure.

14. A fluid treatment element comprising a ribbon spirally wound in a plurality of windings to define a generally disk-shaped body having a radial dimension, a first end surface on one side of the body, a second end surface on the opposite side of the body, and an outer rim, wherein the ribbon includes a multilayer composite having at least first and second superposed layers, the first layer including a strip of a permeable fluid treatment medium, and wherein the ribbon has opposite major surfaces and is free of any through holes or slots extending, between the opposite major surfaces.

15. The fluid treatment element of claim 14 wherein the second layer includes a bonding strip.

16. A fluid treatment arrangement comprising a hollow core assembly having an interior and plurality of openings and at least first and second fluid treatment elements mounted along the core assembly, wherein at least one of the fluid treatment elements comprises a fluid treatment element of claim 14.

17. A fluid treatment assembly comprising a housing and a fluid treatment arrangement of claim 16 disposed inside the housing, wherein the housing has first and second ports and defines a fluid flow path between the first and second ports and wherein the fluid treatment arrangement is positioned in the housing across the fluid flow path.

18. A method for making a fluid treatment element comprising:
spirally winding a first ribbon having a multilayer composite including a permeable fluid treatment medium in a plurality of windings around a perforated core and forming a first generally disk-shaped body having opposite first and second end surfaces, an inner rim, and an outer rim and
spirally winding a separate second ribbon having a multilayer composite including a permeable fluid treatment medium in a plurality of windings around the perforated core and forming an adjacent second generally disk-shaped body having opposite first and second end surfaces, an inner rim, and an outer rim, including forming a space between the first end surfaces of the first and second disk-shaped bodies which is substantially free of structure, wherein each ribbon has opposite major surfaces and is free of any through holes or slots extending between the opposite major surfaces and wherein the first surfaces of the first and second disk-shaped bodies have no points of contact between them.

* * * * *